US009003371B2

(12) United States Patent
Kuncolienkar

(10) Patent No.: US 9,003,371 B2
(45) Date of Patent: Apr. 7, 2015

(54) RECURSIVE METHOD CALL REPRESENTATION IN A PLOT VIEW OF METHOD EXECUTION PERFORMANCE

(75) Inventor: Shirish Trivikram Shenvi Kuncolienkar, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 1134 days.

(21) Appl. No.: 12/982,729

(22) Filed: Dec. 30, 2010

(65) Prior Publication Data

US 2012/0174072 A1 Jul. 5, 2012

(51) Int. Cl.
*G06F 9/44* (2006.01)

(52) U.S. Cl.
CPC .................... *G06F 9/4421* (2013.01)

(58) Field of Classification Search
None
See application file for complete search history.

(56) References Cited

U.S. PATENT DOCUMENTS

| | | | | |
|---|---|---|---|---|
| 5,168,554 | A * | 12/1992 | Luke | 715/209 |
| 5,210,859 | A * | 5/1993 | Aoshima et al. | 714/46 |
| 5,375,125 | A * | 12/1994 | Oshima et al. | 714/38.13 |
| 5,862,381 | A * | 1/1999 | Advani et al. | 717/125 |
| 7,392,510 | B1 * | 6/2008 | Treder et al. | 717/128 |
| 2003/0159133 | A1 * | 8/2003 | Ferri et al. | 717/130 |
| 2008/0127109 | A1 * | 5/2008 | Simeon | 717/128 |
| 2009/0222786 | A1 | 9/2009 | Malcolm | |
| 2009/0265324 | A1 | 10/2009 | Mordvinov et al. | |
| 2010/0199264 | A1 | 8/2010 | Maeda | |
| 2011/0145800 | A1 * | 6/2011 | Rao et al. | 717/133 |

OTHER PUBLICATIONS

Kuhn et al., "Exploiting the Analogy Between Traces and Signal Processing," Software Maintenance, 2006. ICSM '06. 22nd IEEE International Conference on Sep. 2006.*
Trumper et al., "Understanding Complex Multithreaded Software Systems by Using Trace Visualization," ACM, SOFTVIS'10, Oct. 25-26, 2010.*

* cited by examiner

*Primary Examiner* — Insun Kang
(74) *Attorney, Agent, or Firm* — Steven M. Greenberg, Esq.; CRGO Law

(57) ABSTRACT

Embodiments of the present invention provide a method, system and computer program product for graphically representing recursive method calls in a plot view. In an embodiment of the invention, a method for graphically representing recursive method calls in a plot view includes tracing entry and exit points for method calls in an executing computer program subject to performance testing in a performance test application executing in memory of a computer. The method further includes plotting a duration of execution for each of the method calls in a visual plot according to the traced entry and exit points. Finally, the method includes visually displaying a recursive relationship between selected ones of the method calls in the visual plot in response to determining a recursive relationship from the traced entry and exit points.

15 Claims, 1 Drawing Sheet

RECURSIVE METHOD CALL REPRESENTATION IN A PLOT VIEW OF METHOD EXECUTION PERFORMANCE

BACKGROUND OF THE INVENTION

1. Field of the Invention

The present invention relates to computer program performance analysis and more particularly to plot view generation for method execution performance.

2. Description of the Related Art

In software engineering, performance testing determines how fast some aspect of a computing application performs under operating conditions. Performance testing also validates and verifies other attributes of the computing application, for example the scalability, reliability and resource usage of the computing application. Importantly, in some circumstances, performance testing of a computing system is intended to demonstrate that the computing application meets particular performance criteria, often specified by the end user. In other circumstances, performance testing measures those segments of the computing application causing the computing application to perform poorly. In the latter circumstance, profiling and debugging tools identify portions of the computing application contributing most to the poor performance.

A popular debugging tool used in performance testing is the trace tool. While the process of tracing can range from the rudimentary placement of print statements in source code to trace the flow of execution of a computer program, advanced forms of tracing provide for the dynamic visual notation of source code under execution so as to indicate to the developer where in the source code a run time error has occurred. In particular, in tracing through source code while monitoring or "watching" variables of interest, the values of the variables can be compared to expected values at the execution of each line of source code so as to identify unexpected values resulting from run time errors.

While tracing has its origins in debugging, tracing also enjoys a prominent place in performance testing of a computer program. Specifically, the trace function has been used to identify when a method (also referred to in the art as a "function") has been invoked and when the method has completed operation. Thus, the trace function can be used to measure a time of performance for a traced method. Methods consuming excessive time to execute can be readily identified, modified and then monitored to measure the impact of any changes on the time to perform the method. To facilitate an understanding of the time consumed in invoking a method to completion, it is common to graph the results on a bar chart in which the position of a line on the x-axis of the chart reflects a time of invocation of a method and the amplitude reflects a time to perform the method. Operationally, a trace function can record the time when the method is invoked in the source code and the trace function subsequently can record when the method exits. The data produced by the trace functions can be provided to the graph to visually indicate the time to execute the method.

Conventional modes of visually plotting the time of performance of a method can account for the single invocation of the method, however, the recursive invocation of the method—that is the invocation of the method from within the method—will not be apparent from the visual plot. Rather, for the casual observer, a root invocation of the method will appear to incur substantial delays in performing, while nested children invocations will register improving temporal performance. A conclusion will then be drawn in error, that some external factor has caused initial poor performance eventually resolved when in fact, as the recursive calls to the method unwind towards the root invocation of the method, the time to performance will appear to improve as well.

BRIEF SUMMARY OF THE INVENTION

Embodiments of the present invention address deficiencies of the art in respect to visually plotting temporal performance of recursive method calls and provide a novel and non-obvious method, system and computer program product for graphically representing recursive method calls in a plot view. In an embodiment of the invention, a method for graphically representing recursive method calls in a plot view includes tracing entry and exit points for method calls in an executing computer program subject to performance testing in a performance test application executing in memory of a computer. The method further includes plotting a duration of execution for each of the method calls in a visual plot according to the traced entry and exit points. Finally, the method includes visually displaying a recursive relationship between selected ones of the method calls in the visual plot in response to determining a recursive relationship from the traced entry and exit points.

In one aspect of the embodiment, tracing entry and exit points for method calls also can include creating a data point object for each traced entry point with a data member indicating a start time of execution of a corresponding method call of a method, placing each created data point object onto a stack, popping a data point object from the stack for each traced exit point and updating a data member of the popped data point object with a duration of time of execution of the corresponding method call, and, in response to determining that a different data point object remains on the stack for a different method call of the method, updating a data member of the popped data point object to indicate a parent-child relationship between the corresponding method call of the popped data point object and the different method call of the different data point object.

In another embodiment of the invention, a performance testing data processing system is provided. The system includes a host computer with memory and at least one processor and a performance test application executing in the memory of the host computer. The system further includes a stack of data point objects in the memory. Each data point object includes a start time data member, a duration of execution data member and a parent-child relationship data member. Finally, the system includes a plot view generation for recursive method calls module coupled to the stack and the performance test application. The module includes program code enabled upon execution in the host computer to plotting a duration of execution for method calls in a visual plot according to traced entry and exit points for the method calls, and to visually display a recursive relationship between selected ones of the method calls in the visual plot in response to determining a recursive relationship from the traced entry and exit points.

In one aspect of the embodiment, the visual plot includes different plotted vertical lines placed in the visual plot for different popped data point objects from the stack. Further, each vertical line is placed in the visual plot at a position representative of a time of execution of a corresponding method call and has a magnitude reflecting a duration of execution of the corresponding method call. In another aspect of the embodiment, the visual plot further provides a visual indication of a recursive relationship between plotted lines in the visual plot for different data point objects where one of the data point objects indicates a parent-child relationship with the other of the data point objects.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for graphically representing recursive method calls in a plot view. In accordance with an embodiment of the invention, during a debugging session of source code for a computer program, an entry event resulting from entry in the source code of an invoked method can be detected. Thereafter, an exit event resulting from an exit in the source code of an invoked method can be detected. In response to detecting the exit event, it can be determined if a different entry event remains to be processed. If so, the invoked method can be designated a recursive child method invocation from an invoked method corresponding to the different entry event. Otherwise, the execution time of the invoked method can be computed and plotted on a visual plot of execution times for methods in the computer program.

Figure 1:
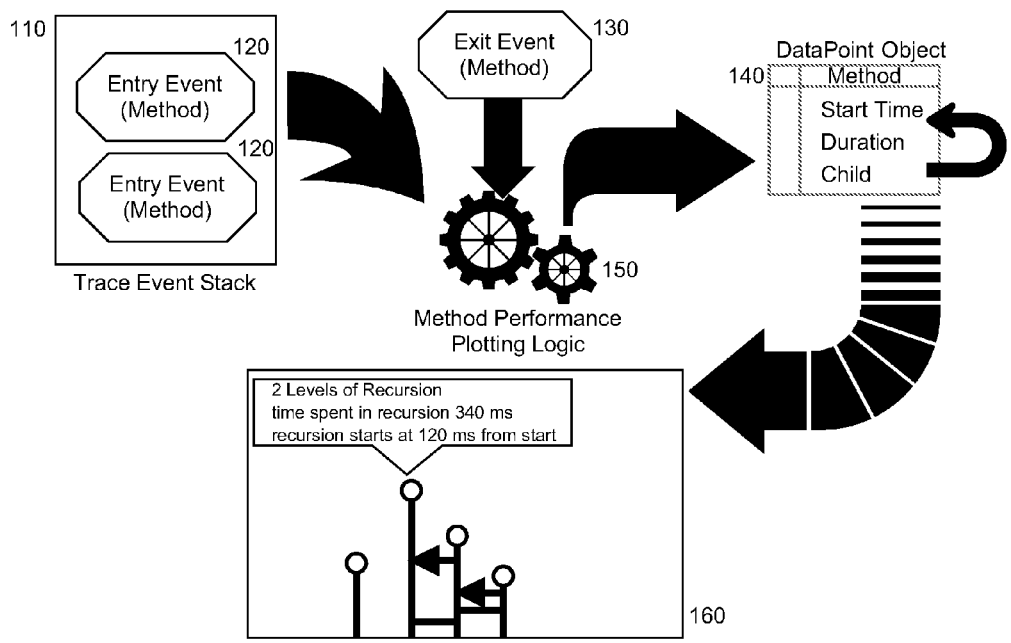
FIG. 1 is a pictorial illustration of a process for graphically representing recursive method calls in a plot view.

In further illustration, FIG. 1 is a pictorial illustration of a process for graphically representing recursive method calls in a plot view. As shown in FIG. 1, a stack 110 of data point objects 120 for entry point trace events can be maintained during traced execution of a computer program. Each data point object 120 in the stack can store a start time of execution of a corresponding method resulting from the receipt of an entry point trace event for a method call in the computer program. As method performance plotting logic 150 receives an exit point trace event 130 during the course of performance testing the computer program, a data point object 120 in the stack 110 can be popped to match a corresponding entry point trace event to the received exit point trace event 130.

Of note, the stack 110 can be inspected to determine if additional data point objects 120 for the method call remain on the stack 110. If not, the popped data point object 120 can be modified to indicate a time of duration for execution of the corresponding method call and the popped data point object 120 can be reflected visually in a visual performance plot 160. Otherwise, the method performance plotting logic 150 can conclude that the received exit point trace event 130 corresponds to a recursive method call and the data point object 120 popped from the stack 110 can be modified to reflect the data point object 140 indicating that the method call had been recursively called from another method call referenced in the additional data point object 120 on the stack. As such, when the data point object 140 is plotted on the visual performance plot 160, a visual indication of the recursive nature of the method call can be provided.

Figure 2:
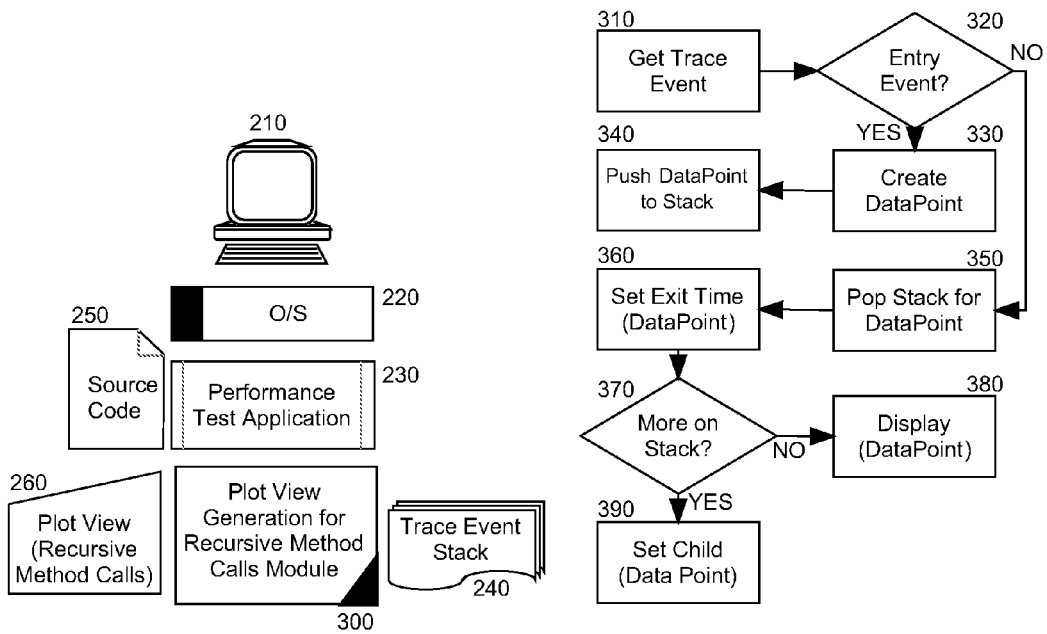
FIG. 2 is a schematic illustration of a performance testing data processing system configured for graphically representing recursive method calls in a plot view; and, FIG. 3 is a flow chart illustrating a process for graphically representing recursive method calls in a plot view.

The process described in connection with FIG. 1 can be implemented in a performance testing data processing system. In this regard, FIG. 2 is a schematic illustration of a performance testing data processing system configured for graphically representing recursive method calls in a plot view. The system can include a host computer 210 with at least one processor and memory supporting the execution of an operating system 220. The operating system 220 in turn can host the operation of a performance test application 230 configured to perform performance testing upon a computer program (not shown) produced from source code 250.

A plot view generation for recursive calls module 300 can be coupled to the performance test application 230. The module 300 can include program code that when executed in the memory of the host computer 210 can manage a stack of data point objects 240 resulting from received entry point trace events during performance testing of the computer program produced from the source code 250. In this regard, each data point object can be an instance of a class data structure defined in prototype as follows:

```
class DataPoint {
    double start_time;
    double time_taken;
    DataPoint child;
}
```

Thus, each data point object can store for a corresponding method call a start time when the entry point trace event is received, and a time taken to execute computed as the difference from when an exit point trace event is received for the corresponding method call and the start time. Further, each data point object optionally can include a reference to another data point object when it is determined that the corresponding method call had been called recursively.

In the course of managing the stack of data point objects 240, the program code of the module 300 can respond to the receipt of an exit point trace event for a corresponding method call by popping an entry from the stack of data point objects 240 for the corresponding method. However, if it is determined that another data point object remains on the stack of data point objects 240, it can be concluded that the corresponding method call had been called recursively and the program code of the module 300 can update the data point object popped from the stack of data point objects 240 to reference a method call for the data point object remaining in the stack of data point objects 240. Consequently, when rendering plot lines on a plot view 260 of the method calls, the plot line drawn for the corresponding method call not only can indicate a duration of execution for the corresponding method call, but also the plot line can indicate the recursive relationship to a parent plot line referenced by the child data member of the popped data point object.

Figure 3:
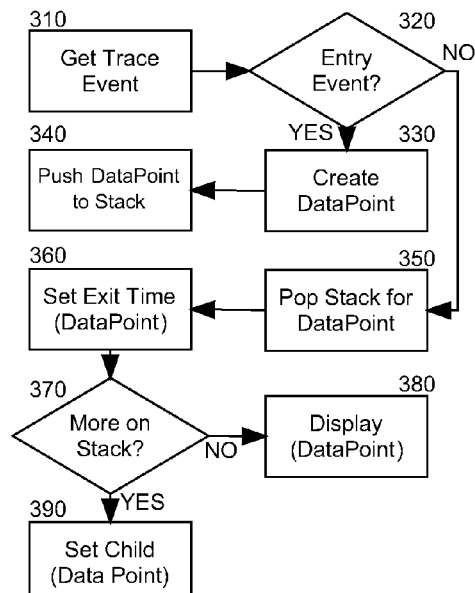

In even yet further illustration of the operation of the program code of the module 300, FIG. 3 is a flow chart illustrating a process for graphically representing recursive method calls in a plot view. Beginning in block 310, a trace event can be received for a method call in an executing computer program subject to performance testing. In decision block 320, it can be determined whether the trace event is one for an entry point or an exit point. If the trace event is determined to have resulted from an entry point of a corresponding method call, a data point object can be created with the start time data member populated and in block 340 the data point object can be pushed to a stack.

In decision block 320, if it is determined that the trace event has resulted from an exit point of a corresponding method call, in block 350, the stack can be popped to produce a data point object for the corresponding method call. In block 360, an exit time can be determined and a duration of execution computed and written to the data point object. In decision block 370, if additional data point objects remain on the stack, then in block 390 the child data member of the data point object can be updated to refer to a method call for the data point object remaining at the top of the stack. However, in decision block 370, if no additional data point objects remain on the stack, in block 380 the popped data point object can be processed for visual display in a plot view of method performance in which a vertical plot line is drawn at a position indicative of a start time referenced in the popped data point object with a height representative of a duration of time of execution referenced in the popped data point object.

In either case, when rendering data from a data point object in the plot view, a plot line for a data point object including a reference to a different data point object can include a visual reference to a plot line for the different data point object as a recursive call. Further, the number of levels of recursion for linked data point objects can be computed along with a total time of execution for all recursive method calls. In response to a mouse-over event to a plot line of a recursive method call in the plot view, a pop up window can be displayed with the number of levels of recursion and total time of execution for the recursive method calls.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

I claim:

1. A method for graphically representing recursive method calls in a plot view, the method comprising:
    tracing entry and exit points for method calls in an executing computer program subject to performance testing in a performance test application executing in memory of a computer;
    plotting a duration of execution for each of the method calls in a visual plot according to the traced entry and exit points; and,
    visually displaying a recursive relationship between selected ones of the method calls in the visual plot in response to determining a recursive relationship from the traced entry and exit points.

2. The method of claim 1, wherein tracing entry and exit points for method calls further comprises:
    creating a data point object for each traced entry point with a data member indicating a start time of execution of a corresponding method call of a method;
    placing each created data point object onto a stack;
    popping a data point object from the stack for each traced exit point and updating a data member of the popped data point object with a duration of time of execution of the corresponding method call; and,
    responsive to determining that a different data point object remains on the stack for a different method call of the method, updating a data member of the popped data point object to indicate a parent-child relationship between the corresponding method call of the popped data point object and the different method call of the different data point object.

3. The method of claim 2, wherein plotting a duration of execution for each of the method calls in a visual plot according to the traced entry and exit points, comprises plotting a vertical line on a visual plot such that the vertical line is placed for a popped data point object at a position representative of a time of execution of a corresponding method call and a magnitude of the vertical line reflects a duration of execution of the corresponding method call.

4. The method of claim 3, wherein plotting a duration of execution for each of the method calls in a visual plot according to the traced entry and exit points, further comprises visually indicating a recursive relationship between plotted lines in the visual plot for different data point objects where one of the data point objects indicates a parent-child relationship with the other of the data point objects.

5. The method of claim 3, further comprising responding to a mouse over event for a vertical line plotted in the visual plot with a visual indication of a recursive relationship by displaying a pop up window specifying a number of levels of recursion for the recursive relationship.

6. The method of claim 3, further comprising responding to a mouse over event for a vertical line plotted in the visual plot with a visual indication of a recursive relationship by displaying a pop up window specifying a total time of execution for the recursive relationship.

7. A performance testing data processing system comprising:
    a host computer with memory and at least one processor;
    a performance test application executing in the memory of the host computer;
    a stack of data point objects in the memory, each data point object comprising a start time data member, a duration of execution data member and a parent-child relationship data member; and,
    a plot view generation for recursive method calls module coupled to the stack and the performance test application, the module comprising program code enabled upon execution in the host computer to plotting a duration of execution for method calls in a visual plot according to traced entry and exit points for the method calls, and to visually display a recursive relationship between selected ones of the method calls in the visual plot in response to determining a recursive relationship from the traced entry and exit points.

8. The system of claim 7, wherein the visual plot comprises different plotted vertical lines placed in the visual plot for different popped data point objects from the stack, each vertical line being placed in the visual plot at a position representative of a time of execution of a corresponding method call and having a magnitude reflecting a duration of execution of the corresponding method call.

9. The system of claim 8, wherein the visual plot further provides a visual indication of a recursive relationship between plotted lines in the visual plot for different data point objects where one of the data point objects indicates a parent-child relationship with the other of the data point objects.

10. A computer program product for graphically representing recursive method calls in a plot view, the computer program product comprising:

a non-transitory computer readable storage medium comprising a memory device having computer readable program code embodied therewith, the computer readable program code comprising:

computer readable program code for tracing entry and exit points for method calls in an executing computer program subject to performance testing in a performance test application executing in memory of a computer;

computer readable program code for plotting a duration of execution for each of the method calls in a visual plot according to the traced entry and exit points; and, computer readable program code for visually displaying a recursive relationship between selected ones of the method calls in the visual plot in response to determining a recursive relationship from the traced entry and exit points.

11. The computer program product of claim 10, wherein the computer readable program code for tracing entry and exit points for method calls further comprises:

computer readable program code for creating a data point object for each traced entry point with a data member indicating a start time of execution of a corresponding method call of a method;

computer readable program code for placing each created data point object onto a stack;

computer readable program code for popping a data point object from the stack for each traced exit point and updating a data member of the popped data point object with a duration of time of execution of the corresponding method call; and, computer readable program code for responding to a determination that a different data point object remains on the stack for a different method call of the method, by updating a data member of the popped data point object to indicate a parent-child relationship between the corresponding method call of the popped data point object and the different method call of the different data point object.

12. The computer program product of claim 11, wherein the computer readable program code for plotting a duration of execution for each of the method calls in a visual plot according to the traced entry and exit points, comprises computer readable program code for plotting a vertical line on a visual plot such that the vertical line is placed for a popped data point object at a position representative of a time of execution of a corresponding method call and a magnitude of the vertical line reflects a duration of execution of the corresponding method call.

13. The computer program product of claim 12, wherein the computer readable program code for plotting a duration of execution for each of the method calls in a visual plot according to the traced entry and exit points, further comprises computer readable program code for visually indicating a recursive relationship between plotted lines in the visual plot for different data point objects where one of the data point objects indicates a parent-child relationship with the other of the data point objects.

14. The computer program product of claim 12, further comprising computer readable program code for responding to a mouse over event for a vertical line plotted in the visual plot with a visual indication of a recursive relationship by displaying a pop up window specifying a number of levels of recursion for the recursive relationship.

15. The computer program product of claim 12, further comprising computer readable program code for responding to a mouse over event for a vertical line plotted in the visual plot with a visual indication of a recursive relationship by displaying a pop up window specifying a total time of execution for the recursive relationship.

\* \* \* \* \*